United States Patent [19]
Umiker

[11] Patent Number: 5,398,834
[45] Date of Patent: Mar. 21, 1995

[54] CONTAINER, IN PARTICULAR CONTAINER FOR VEGETABLES, MADE FROM PLASTIC MATERIAL AND HAVING FOLDABLE SIDE WALLS

[75] Inventor: Hans Umiker, Egg, Switzerland
[73] Assignee: Schoeller-Plast S.A., Switzerland
[21] Appl. No.: 94,170
[22] PCT Filed: Jan. 15, 1993
[86] PCT No.: PCT/EP93/00091
 § 371 Date: Jul. 27, 1993
 § 102(e) Date: Jul. 27, 1993
[87] PCT Pub. No.: WO93/13991
 PCT Pub. Date: Jul. 22, 1993

[30] Foreign Application Priority Data
Jan. 17, 1992 [DE] Germany .................. 42 01 145
[51] Int. Cl.⁶ .................................................. B65D 7/00
[52] U.S. Cl. ........................................... 220/6; 220/7
[58] Field of Search ..................... 220/6, 7, 62, 339

[56] References Cited
U.S. PATENT DOCUMENTS

| | | | |
|---|---|---|---|
| 3,446,415 | 5/1969 | Bromley | 220/7 X |
| 3,628,683 | 12/1971 | Friedrich | 220/6 |
| 3,973,692 | 8/1976 | Cloyd | 220/7 |
| 4,005,795 | 2/1977 | Mikkelsen et al. | 220/6 X |
| 4,044,910 | 8/1977 | Box | 220/6 X |
| 4,940,155 | 7/1990 | Hewson | 220/6 |

FOREIGN PATENT DOCUMENTS
9300091 1/1993 European Pat. Off. .
8601182 2/1986 WIPO .

Primary Examiner—Steven M. Pollard
Attorney, Agent, or Firm—Remy J. VanOphem

[57] ABSTRACT

In a container made from plastic material, including a container bottom and four side walls foldable in the inside in direction to the container bottom, the container is formed in one piece and the folding joints of the four side walls are formed by film-like hinges at the lower longitudinal rim of the side walls.

10 Claims, 8 Drawing Sheets

CONTAINER, IN PARTICULAR CONTAINER FOR VEGETABLES, MADE FROM PLASTIC MATERIAL AND HAVING FOLDABLE SIDE WALLS

The invention relates to a container in accordance with the preamble of patent claim 1.

As vegetable containers for transferring vegetables and the like from the site of production to the wholesaler and from there to the selling place in most cases still containers made from wood or cardboard are used, which containers, however, for lack of suitable possibility to be cleaned or also for lack of respective stability in case of cardboard are hardly suitable for being used again for multiple times. Containers made from wood or cardboard as well allow only poor or, if ever, insufficiently cleaning. A further disadvantage of traditional packages lies in that they require a disproportionate amount of storage room when being returned.

It is the object of the present invention to overcome the disadvantages of the known prior art and to create containers suited for multiple use. According to a further aspect these containers are to be easily manufacturable and handling of them is to be comfortable as well as only little room is to be required for return transportation.

Said object in accordance with the present invention is solved by the features of claim 1, preferred embodiments of the invention being characterized by features contained in the subclaims.

In accordance with the present invention containers made from plastic material are proposed for use as vegetable containers, said containers being provided with four side walls foldable to the inside over the bottom, so that the containers may after use be transferred in folded position, in which the containers only require a small space, i.e. they can be comfortably stored and returned. Due to being manufactured from plastic material, the containers are robust and allow good cleaning as compared to traditional vegetable containers made from cardboard or wood.

In particularly advantageous manner said container is formed in one piece and the folding hinges of the side walls are embodied by film-like hinges which as compared to other hinges are subject to being polluted in much lower degree and which apart from that can be cleaned much easier, too. Furthermore, from the point of view of production technology, film-like hinges can be manufactured easier and they do in no manner influence the constructional embodiment and the design of the side walls and bottom faces of said containers. The integral production in addition provides the advantage that mounting operations for assembling the container can be completely done without. Also the handling of the container of box during defolding or folding is extremely simple.

In particular for reasons of consumption of room for return transportation of the empty containers it is meaningful to fold the side walls to the inside, where they then should come to bear in particular within the container bottom, i.e. not protruding to the outside exceeding the dimensions of the container bottom. However, for being in a position to realize film-like hinges and, furthermore, for being able to guarantee that in defolded position of the side walls those are supported from bottom, it is advantageous to provide for intermediate elements between the side wall and the container bottom, which sensibly are connected to one another by film-like hinges. Upon removal of the container from the mould the intermediate elements are folded to the inside in direction of the container bottom and are positively locked with the container bottom, so that they form a quasi-permanent component of the bottom. The intermediate elements then preferably simultaneously form the support faces and load-absorbing faces for the side walls, to which they are connected by film-like hinges, in defolded position of the latter.

Advantageously at least the intermediate elements of a pair of opposing side walls are made higher than the intermediate elements of the other pair of side walls, so that the side walls connected to the higher intermediate elements can be folded over the other side walls. In case of overlapping of opposing side walls the intermediate elements must be stepped correspondingly and the thickness of the side walls must be different.

Advantageously the side walls are mutually interlockable in unfolded position, wherein said interlock, however, in contrast to the intermediate elements must be loosenable. Herein, the engagement of locking noses of one side wall with complementary recesses of the other side wall is particularly advantageous.

In the following preferred embodiments of the foldable container are elucidated with reference to the drawings. Therein FIG. 1 shows a perspective view of the container in unfolded position of the side walls, FIG. 2 shows a view in transitional position into the unfolded position, FIG. 3 shows a view in transitional position into the unfolded position, FIG. 4 shows a perspective view of the container according to FIGS. 1 to 3 in folded position, FIG. 5 shows a partical sectional view showing the container bottom, the intermediate element and part of a side wall of the container, FIG. 6 shows a partial view of the representation in FIG. 5 for explanation of the forming process, FIG. 7 shows a view in analogy to FIG. 5, however, in a further embodiment, FIG. 8 shows a partial view in analogy to FIGS. 5 and 7, however, in a further embodiment, FIG. 9 shows a partial view for representation of the interlocking of the two unfolded side walls, FIG. 10 shows a view of the container with side walls partially folded to the inside and FIG. 11 shows a schematic view of a folded container in side view (cut view).

The container under FIGS. 1 to 4 includes a rectangular container bottom denominated with 1 and four side walls 2 to 5, wherein in the shown initial example the basic dimensions thereof amount to 300×400 mm and the side walls referred to by 2 and 4 form longitudinal side walls and the side walls referred to by 3 and 5 form narrow side walls. The side walls 2 to 5 are foldable to the inside onto the container bottom 1, the final folded position of the container resulting from FIG. 4. FIG. 2 shows that for unfolding the container under FIG. 4 at first the two longitudinal side walls 2 and 4 and thereafter the two narrow side walls 3 and 5, positioned therebelow in folded position, are unfolded into a position perpendicular with respect to the container bottom 1. In said upright perpendicular unfolded position of the four side walls said side walls are mutually interlocked with one another, a corresponding interlocking mechanism resulting from FIG. 5, e.g. Furthermore, the side walls 2 to 5 in their unfolded position (FIG. 1) with their lower marginal sides 6 bear on the container bottom or on intermediate elements, respectively, which will still be described in more detail, said intermediate elements forming support faces 7 which also serve for load absorption of containers in a pile.

The box-like container including four side walls and a container bottom is manufactured in one process step as one-piece member, so that an assembling of individual components for forming the container is be done without. The container rather can be folded and transferred into unfolded position, just as it is released from the mould.

The four side walls herein are not directly connected to the container bottom, but they are connected by means of integral intermediate elements 8 to 11, one of which each is shown in FIGS. 5, 7 and 8.

FIG. 5 shows in 1 the container bottom and in 4 a side wall in unfolded position, the intermediate element between the side wall and the container bottom being referred to by 10. The side wall 4 herein is in jointed manner connected to the intermediate element 10 by an elongated film-like hinge 12 and said element 10 is in jointed manner connected to the container bottom 1 by an elongated film-like hinge 13.

FIG. 6 shows the corresponding parts in mould position, as they are manufactured in the injection mould. It can be seen that due to the intermediate element 10 the film-like hinges 12 and 13 can be manufactured correspondingly, so that it is rendered possible to fold the side walls to the inside into the container. Furthermore, it is guaranteed due to the intermediate element that the side walls foldable to the inside bear on a support face, denominated with 7, of the intermediate element. Upon removal of the container from the mould the intermediate elements 8 to 11 are folded in correspondence with the direction of arrow F in FIG. 6 onto or over, respectively, the container bottom, so that one or several locking hook-like noses 14 formed to the intermediate element are pressed into corresponding recesses 15 at the lateral margin of the container bottom 1 and said noses 14 then positively lock behind the recesses, as can be seen from FIG. 5. Said locked or interlocked, respectively, position preferably is permanent, so that the intermediate element 10 then in principle is an integral component of the bottom 1. As can be seen from FIG. 5, the side wall 4 then in load-absorbing manner bearing on the intermediate element can be folded from the shown unfolded position to the inside onto the container bottom 1. The film-like hinges preferably extend across the entire length of the side walls and the intermediate elements.

FIG. 7 shows an intermediate element of another side wall, said intermediate element being formed higher than the intermediate element 10, so that the side wall foldable to the inside, e.g. side wall 4, is disposed higher and thus can be folded over the side wall already folded to the inside. If the embodiment under FIG. 7 is related to the container under FIGS. 1 to 4, the intermediate element will be the intermediate element referred to by 11. Said intermediate element with a locking nose 14 interlocks into a respective recess 15 of the bottom 1. In a further modification, which, however, is not necessary, a locking and centering member 16 is provided for at the lower marginal side 6 of the side wall 4, which member in unfolded position reaches into a corresponding groove or recess of the intermediate element and thus further stabilizes the unfolded position in combination with the interlocking according to FIG. 9.

From FIGS. 5 and 7 also further results the piling position of the container, for which purpose the intermediate elements advantageously are built as piling rims, in that the lower leg 17 of the intermediate elements, formed as U (FIG. 5) or E (FIG. 7) profile, is made somewhat shorter than the legs located thereabove, so that the container with its lower end can be correspondingly placed from top into a container located therebelow and there bears on a corresponding shoulder 18 of the side wall of the lower container, which wall thus contributes to load absorption from top to bottom.

FIG. 8 shows an embodiment in which the intermediate element is not lockable with the container bottom 1 laterally, but is folded from top to the container bottom and with the respective locking noses 14 reaches from top into recesses 15 of the container bottom. Said embodiment has the advantage that during load transfer in the pile the forces are guided through the side walls and the intermediate element on the bottom. This leads to relieving of the locking connections between the intermediate element and the bottom. For better orientation reference numerals of the container of FIGS. 1 t 4 with respect to the side wall 2 have been inserted in FIG. 8.

FIG. 9 shows the mutual interlocking of the side walls with one another by e.g. in opposing side walls 3 and 5 corresponding recesses are formed in the marginal sides 19 and corresponding locking hooks 20 are formed at the rims of the side wall 2 at the inner wall face, preferably one above the other, so that during unfolding of the side walls the locking noses 20 can be forced into corresponding recesses 21. This interlock is reversable, wherein by a gentle pulling of the corresponding side walls 2 and 5 to one another the locking noses 20 can be moved out of the recesses 21. In FIG. 9 also the respective intermediate element is shown in dotted line. It is advantageous to arrange three hooks and/or recesses, respectively, one above the other per each side wall.

FIG. 10 is a purely schematical one and is intended for elucidation of the intermediate elements differing in height, as an unfolded position of the side walls to a horizontal position to the outside is not possible in the container according to the present invention.

FIG. 11 also shows the differing height of the intermediate elements, here 9, 10 and 11, so that the side walls each can be folded across the other side walls. The differing height of the intermediate elements 9 and 10 of a pair of opposing side walls 5 and 3 becomes clear from the fact that the side walls 3 and 5 overlap in folded position, so that the intermediate elements must be correspondingly higher by the amount of thickness of the side walls. The intermediate element 10 is correspondingly higher, as the side wall 4 must be folded across the side walls 3 and 5.

FIG. 12 elucidates the folding of the side walls one over the other and the requirement of differing heights of the intermediate elements.

As can be quite clearly seen from FIGS. 5, 7 and 8, the film-like hinge is located between a side wall and the corresponding intermediate element at the inside margin of the side wall, so that the corresponding side wall can only be folded to the inside with respect to the container and in upright perpendicular position with its lower marginal face denominated with 6 bears on the corresponding support face 7 of the intermediate element. The side wall thus cannot be folded to the outside.

I claim:

1. A one-piece container having an interior volume for carrying items, such as vegetables, said one-piece container comprising:
    a bottom member having four edges;
    four intermediate side walls, each intermediate side wall of said four intermediate side walls having a respective top edge and bottom edge, each respective bottom edge of said four intermediate side walls being connected to a respective edge of said four edges of said bottom member;
    four side walls, each side wall of said four side walls having a bottom edge connected to a respective top edge of a respective intermediate side wall of said four intermediate side walls and being foldable in a direction toward said interior volume of said container, and in a direction away from said interior volume of said container;
    a first hinge means integrally connecting said respective bottom edge of each said intermediate side wall of said four intermediate side walls with a respective edge of said four edges of said bottom member; and
    a second hinge means integrally connecting said top edge of a respective intermediate side wall of said four intermediate side walls with said respective bottom edge of each side wall of said four side walls;
    whereby each side wall of said four side walls, each intermediate side wall of said four intermediate side walls and said bottom member are all integrally connected such that each side wall of said four side walls will only fold inward independent of its respective intermediate side wall and each side wall of said four side walls will only fold outward in conjunction with its respective intermediate side wall.

2. The one-piece container of claim 1 wherein said one-piece container is rectangular in shape, said one-piece container having a longitudinal side and a narrow side, said intermediate side walls of said longitudinal side having a height different than the height of said intermediate walls of said narrow side, wherein said height difference between said intermediate side walls of said narrow side and said intermediate side walls of said longitudinal side corresponds to an integer factor of the thickness of a side wall of said four side walls.

3. The one-piece container of claim 1 further comprising:
    means for locking each said intermediate side wall of said four intermediate side walls with said bottom member.

4. The one-piece container of claim 3 wherein said locking means further comprises:
    means for permanently locking each intermediate side wall to said bottom member.

5. The one-piece container of claim 3 wherein each intermediate side wall of said four intermediate side walls has a height different from each other, and wherein each difference in height between any two intermediate side walls corresponds to an integer factor of the thickness of a side wall of said four side walls.

6. The one-piece container of claim 5 further comprising means for locking each said side wall of said four side walls to its adjoining side wall of said four side walls.

7. The one-piece container of claim 5 wherein each intermediate side wall of said four intermediate side walls has a U-shaped cross section.

8. The one-piece container of claim 5 wherein each intermediate side wall of said four intermediate side walls has an E-shaped cross section.

9. The one-piece container of claim 5 wherein each intermediate side wall of said four intermediate side walls has an E-shaped cross section.

10. The one-piece container of claim 1 wherein said first hinge means and said second hinge means are each an integral thin-film hinge.

* * * * *

UNITED STATES PATENT AND TRADEMARK OFFICE
CERTIFICATE OF CORRECTION

PATENT NO. : 5,398,834  
DATED : March 21, 1995  
INVENTOR(S) : Hans Umiker

Page 1 of 5

It is certified that error appears in the above-indentified patent and that said Letters Patent is hereby corrected as shown below:

Title page, item [57], and Columns 1 through 6, delete in their entirety and substitute with the attachment.

Signed and Sealed this

Third Day of October, 1995

Attest:

BRUCE LEHMAN

Attesting Officer  Commissioner of Patents and Trademarks

United States Patent [19]

Umiker

[11] Patent Number: 5,398,834
[45] Date of Patent: Mar. 21, 1995

[54] CONTAINER, IN PARTICULAR CONTAINER FOR VEGETABLES, MADE FROM PLASTIC MATERIAL AND HAVING FOLDABLE SIDE WALLS

[75] Inventor: Hans Umiker, Egg, Switzerland

[73] Assignee: Schoeller-Plast S.A., Switzerland

[21] Appl. No.: 94,170

[22] PCT Filed: Jan. 15, 1993

[86] PCT No.: PCT/EP93/00091

§ 371 Date: Jul. 27, 1993

§ 102(e) Date: Jul. 27, 1993

[87] PCT Pub. No.: WO93/13991

PCT Pub. Date: Jul. 22, 1993

[30] Foreign Application Priority Data

Jan. 17, 1992 [DE] Germany ............................ 42 01 145

[51] Int. Cl.⁶ ................................................ B65D 7/00
[52] U.S. Cl. ............................................. 220/6; 220/7
[58] Field of Search ........................... 220/6, 7, 62, 339

[56] References Cited

U.S. PATENT DOCUMENTS

| 3,446,415 | 5/1969 | Bromley | 220/7 X |
| 3,628,683 | 12/1971 | Friedrich | 220/6 |
| 3,973,692 | 8/1976 | Cloyd | 220/7 |
| 4,005,795 | 2/1977 | Mikkelsen et al. | 220/6 X |
| 4,044,910 | 8/1977 | Box | 220/6 X |
| 4,940,155 | 7/1990 | Hewson | 220/6 |

FOREIGN PATENT DOCUMENTS 9300091 1/1993 European Pat. Off. .
8601182 2/1986 WIPO .

*Primary Examiner*—Steven M. Pollard
*Attorney, Agent, or Firm*—Remy J. VanOphem

[57] ABSTRACT

A container made from plastic material, including a container bottom and four side walls which are foldable to the inside in the direction of the container bottom, the container is formed in one piece and the folding joints of the four side walls are formed by film-like hinges at the lower longitudinal rim of the side walls.

10 Claims, 8 Drawing Sheets

CONTAINER, IN PARTICULAR CONTAINER FOR VEGETABLES, MADE FROM PLASTIC MATERIAL AND HAVING FOLDABLE SIDE WALLS

BACKGROUND OF THE INVENTION

The invention relates to a plastic container and, in particular, to a container for vegetables that has foldable side walls.

Vegetable containers for transferring vegetables and the like from the site of production to the wholesaler and then to the retailer are, in most cases, still made from wood or cardboard. Such containers, however, have the disadvantage of being virtually impossible to clean and, in the case of cardboard, lack the necessary stability to permit them to be used multiple times. A further disadvantage of such traditional containers is the disproportionate amount of storage room they occupy when they are empty.

It is the object of the present invention to overcome the disadvantages of the known prior art and to create containers which are suitable for multiple use, easily manufacturable, comfortable to handle, and require a minimum of storage or transportation space when they are empty.

SUMMARY OF THE INVENTION

In accordance with the present invention, containers made from plastic material are proposed for use as vegetable containers. The containers are provided with four side walls foldable to the inside over the bottom, so that the containers may after use be transferred in a folded position, in which the containers only require a small space, i.e. they can be comfortably stored and returned. Because they are manufactured from plastic material, the containers are durable and allow good cleaning as compared to traditional vegetable containers made from cardboard or wood.

In a particularly advantageous manner, the container is formed in one piece and the folding hinges of the side walls are embodied by film-like hinges which, as compared to other hinges, are less subject to being polluted and which also can be cleaned much easier. Furthermore, from the point of view of production technology, film-like hinges can be more easily manufactured and they in no way influence the constructional embodiment and the design of the side walls and bottom faces of the containers. In addition, the integral construction provides the advantage that mounting operations for assembling the container can be completely eliminated. Also handling of the container or box during unfolding or folding is extremely simple.

In order to conserve room for the return transportation of the empty containers, it is meaningful to fold the side walls to the inside, where they then should come to bear in particular within the container bottom, i.e. not protruding to the outside exceeding the dimensions of the container bottom. However, in order to facilitate use of the film-like hinges and, furthermore, to be able to guarantee that when in the unfolded position the side walls are supported from the bottom, it is advantageous to provide four intermediate elements between the side wall and the container bottom, which sensibly are connected to one another by film-like hinges. Upon removal of the container from the mold the intermediate elements are folded to the inside in the direction of the container bottom, so that they form a quasi-permanent component of the bottom. The intermediate elements then preferably simultaneously form the support faces and load-absorbing faces for the side walls, to which they are connected by film-like hinges, in the unfolded position of the latter.

According to a further feature of the invention at least the intermediate elements of a pair of opposing side walls are made higher than the intermediate elements of the other pair of side walls, so that the side walls connected to the higher intermediate elements can be folded over the other side walls. In case of overlapping of opposing side walls the intermediate elements must be stepped correspondingly and the thickness of the side walls must be different.

According to yet another feature of the invention, the side walls are mutually interlockable in the unfolded position, wherein the interlock, however, in contrast to the intermediate elements must be adjustable. Herein, the engagement of locking noses of one side wall with complementary recesses of the other side wall is particularly advantageous.

The objects, features, and advantages of the invention will be better understood from the following description thereof when taken in conjunction with the appended drawings.

DETAILED DESCRIPTION OF THE PREFERRED EMBODIMENT

Figure 1:
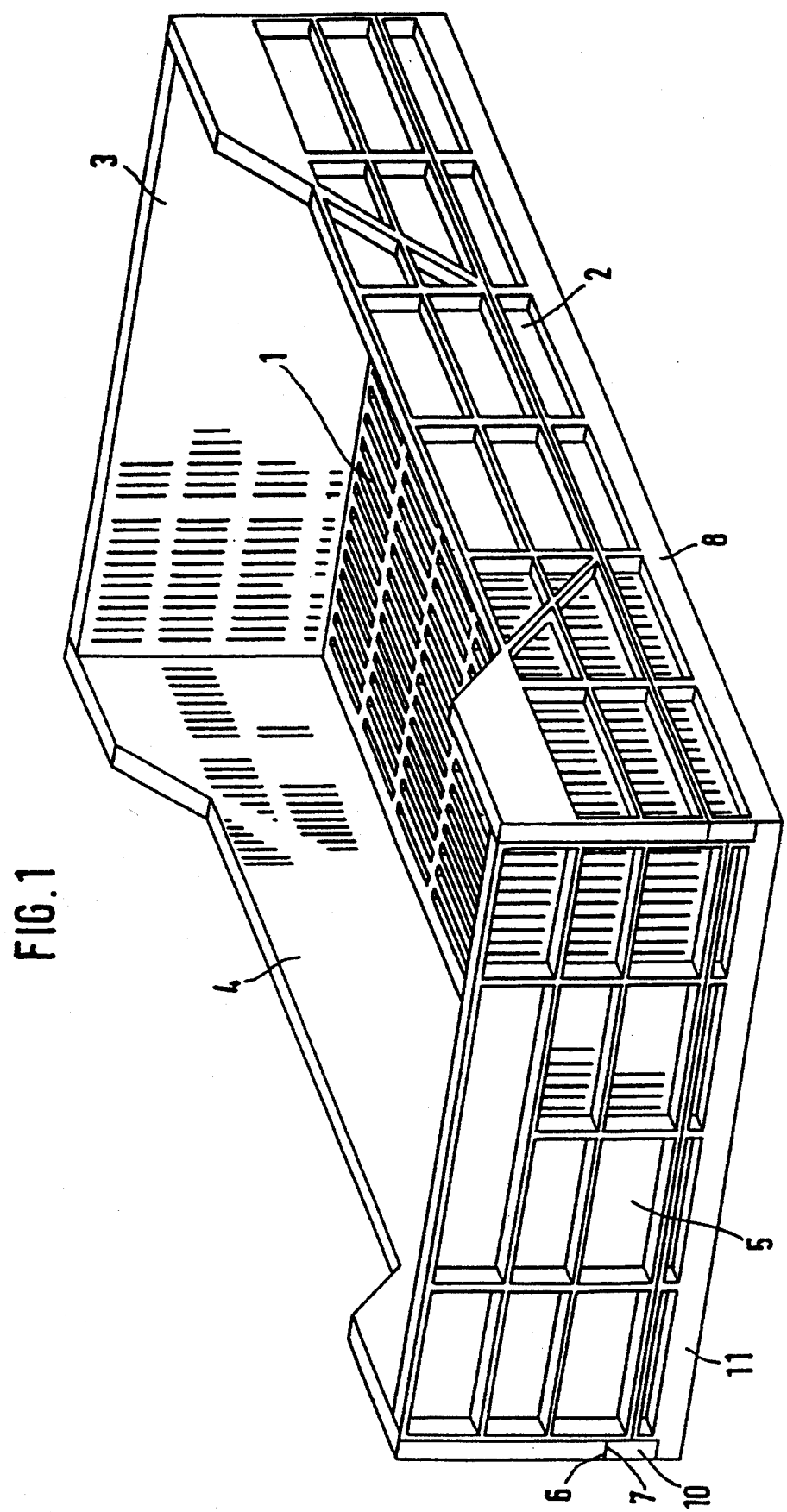
FIG. 1 is a perspective view of the container with the side walls in an unfolded position.
Figure 2:
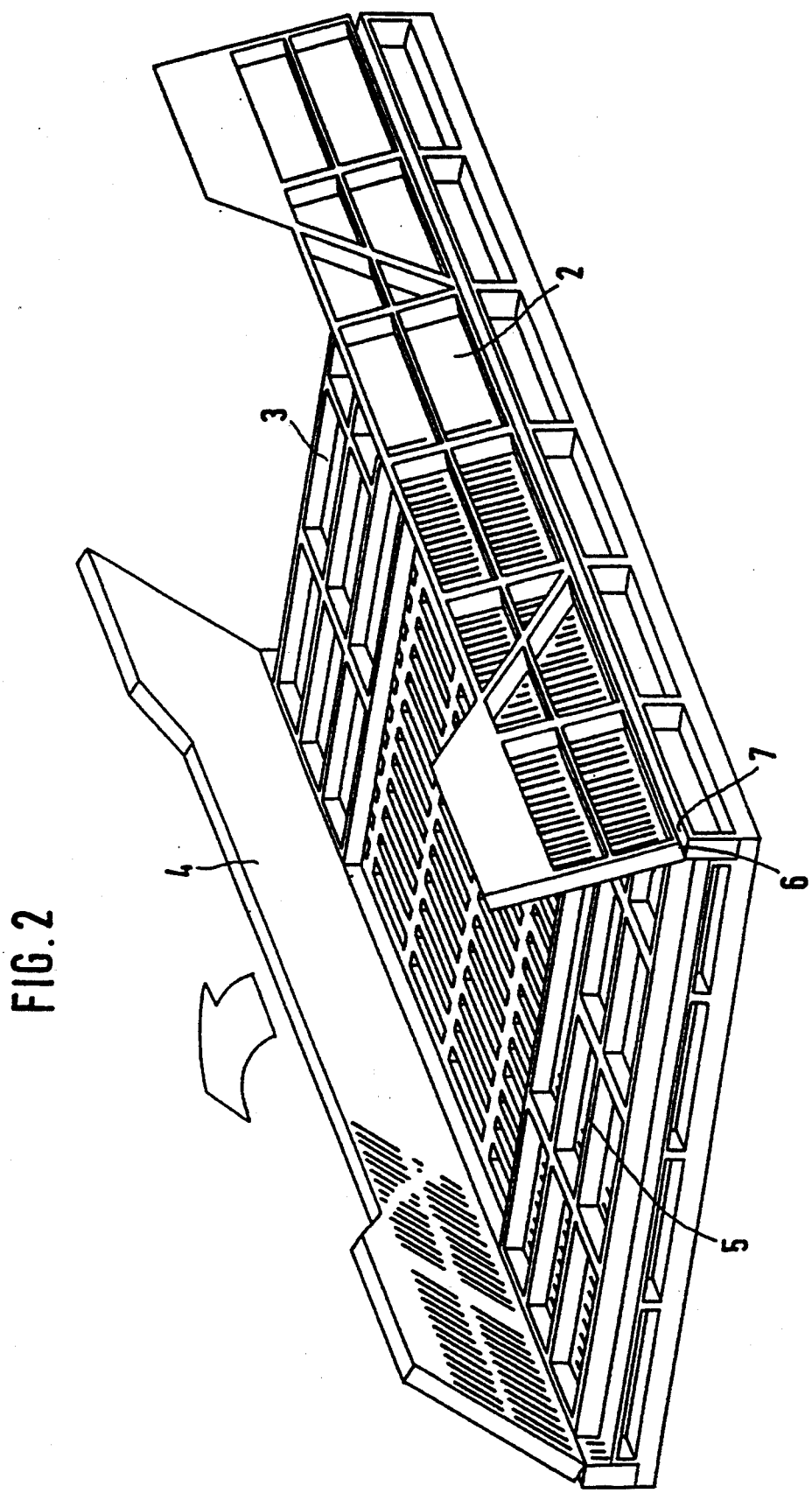
FIG. 2 is a view of an opposed pair of container side walls in transitional position into the unfolded position.
Figure 3:
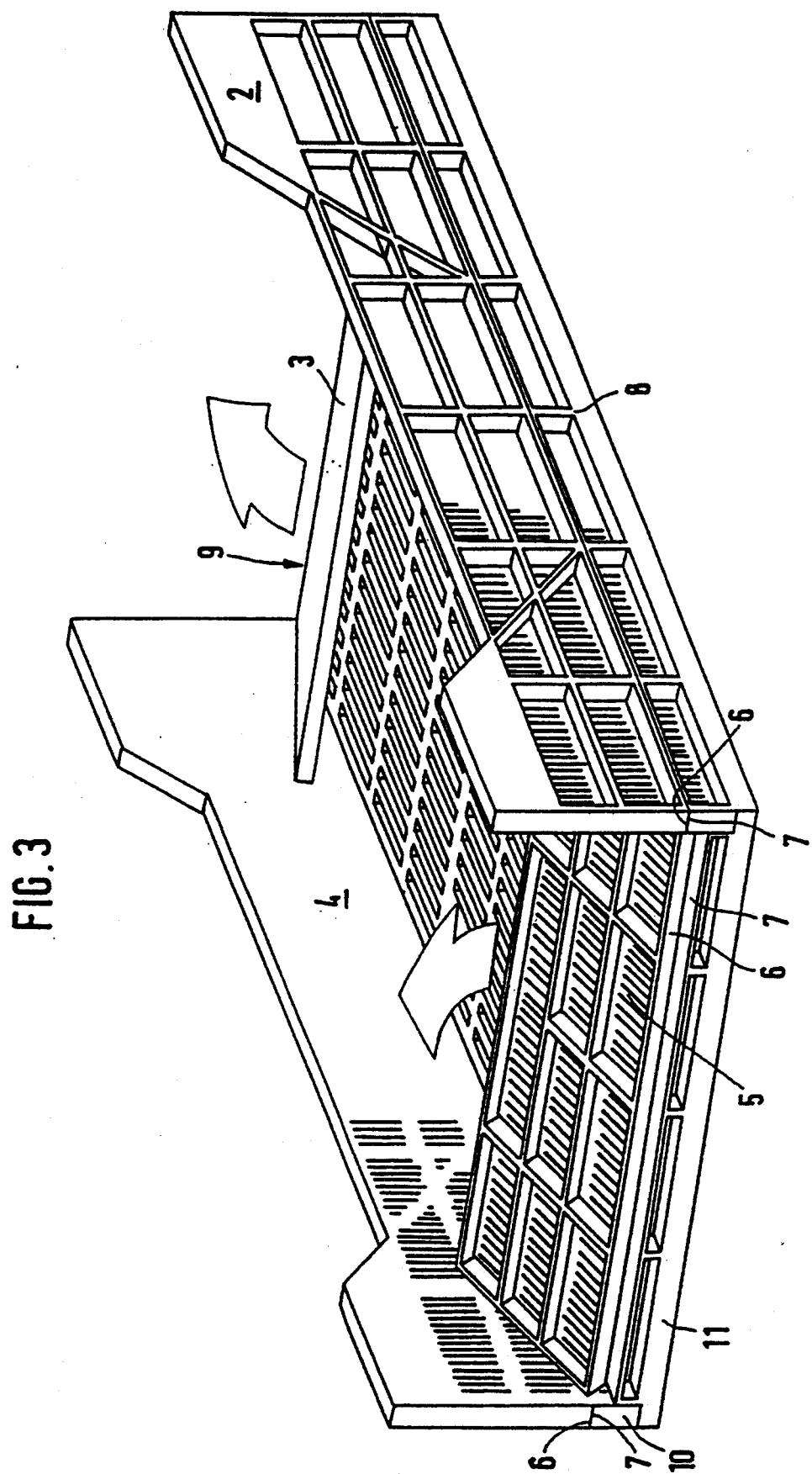
FIG. 3 is a view of the other pair of opposed container side walls in transitional position into the unfolded position.
Figure 4:
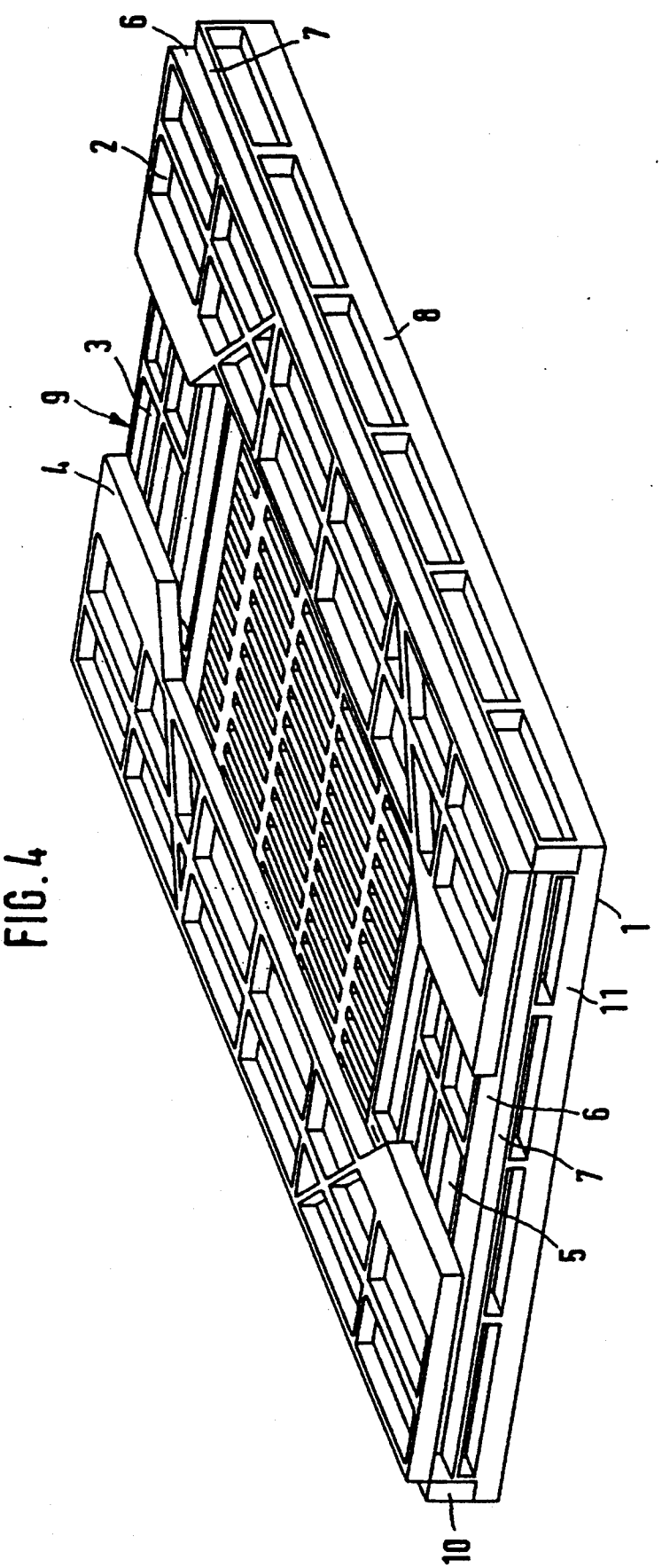
FIG. 4 is a perspective view of the container according to FIGS. 1 to 3 in the folded position.
Figure 5:
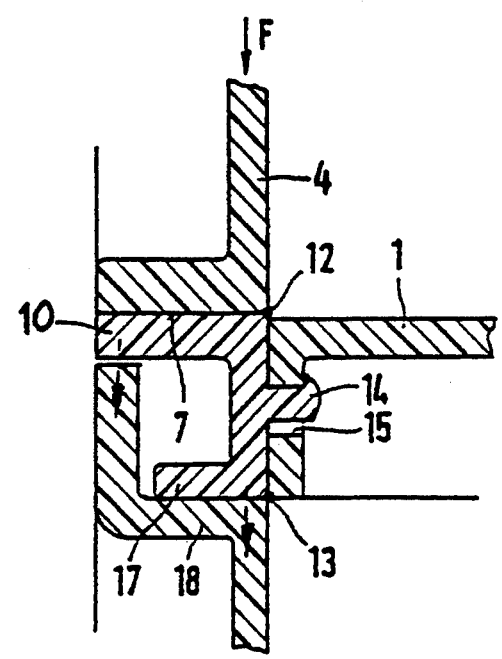
FIG. 5 is a partial sectional view showing the container bottom, the intermediate element and part of a side wall of the container.

With reference to FIGS. 1 through 4, a container in accordance with the present invention includes a rectangular container bottom 1 and four side walls 2 to 5, wherein in the initial example shown the basic dimensions thereof amount to 300×400 mm. The side walls 2 and 4 form longitudinal side walls and the side walls 3 and 5 form narrow side walls. The side walls 2 to 5 are foldable to the inside onto the container bottom 1, the final folded position of the container being depicted in FIG. 4. FIG. 2 shows that for unfolding the container first the two longitudinal side walls 2 and 4 and thereafter the two narrow side walls 3 and 5, positioned therebelow in folded position, are unfolded into a position perpendicular with respect to the container bottom 1. In the upright perpendicular unfolded position of the four side walls, the side walls are mutually interlocked with one another, as best depicted in FIG. 5. Furthermore, the side walls 2 to 5 in their unfolded position (FIG. 1) with their lower marginal sides 6 bear on the container bottom or on intermediate elements 8 through 11, respectively, which will be described in more detail, the intermediate elements forming support faces 7 which also serve for load absorption of containers when stacked on top of each other.

The box-like container including four side walls and a container bottom is manufactured in one process step as a one-piece member, so that assembling of individual components for forming the container is eliminated. The container can be folded and transferred into an unfolded position, just as it is released from the mold.

Figure 7:
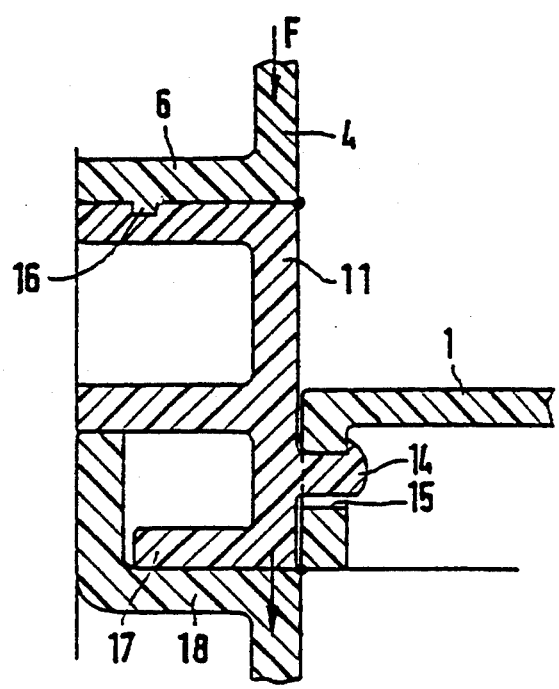
FIG. 7 is an analogous view to that of FIG. 5, depicting an alternate embodiment of the invention.
Figure 8:
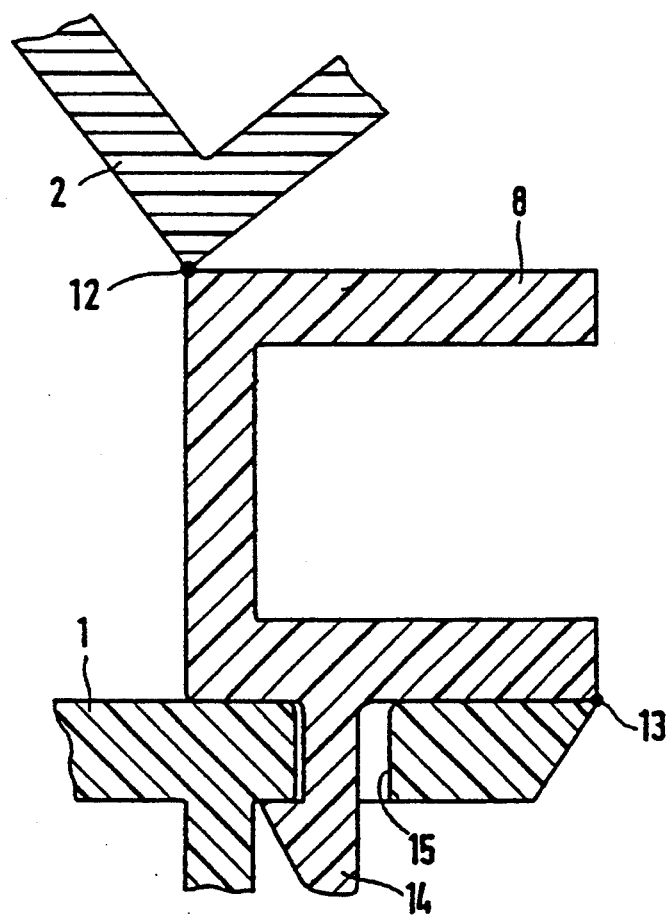
FIG. 8 is a partial view similar to FIGS. 5 and 7, depicting a yet further embodiment of the invention.

The four side walls herein are not directly connected to the container bottom, but they are connected by means of the integral intermediate elements 8 to 11, as best shown in FIGS. 5, 7 and 8.

FIG. 5 shows the container bottom 1 and the side wall 4 in the unfolded position with the intermediate element 10 between the side wall and the container bottom. The side wall 4 herein is in jointed manner connected to the intermediate element 10 by an elongated film-like hinge 12 and the intermediate element 10 is in jointed manner connected to the container bottom 1 by an elongated film-like hinge 13.

Figure 6:
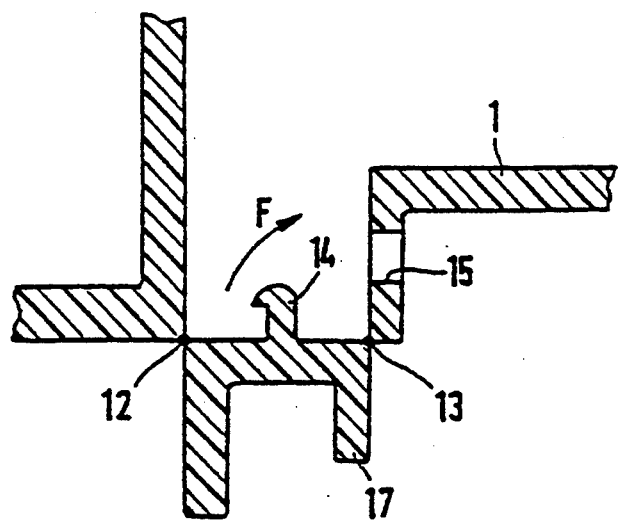
FIG. 6 is a partial view of the representation in FIG. 5 for explanation of the forming process.

FIG. 6 shows the corresponding parts in mold position, as they are manufactured in the injection mold. It can be seen that due to the intermediate element 10 the film-like hinges 12 and 13 can be manufactured correspondingly, so that it is possible to fold the side walls to the inside into the container. Furthermore, it is guaranteed due to the intermediate element that the side walls which are foldable to the inside bear on a support face of the intermediate element. Upon removal of the container from the mold the intermediate elements 8 to 11 are folded in correspondence with the direction of arrow F in FIG. 6 onto or over, respectively, the container bottom, so that one or several locking hook-like noses 14 formed in the intermediate element are pressed into corresponding recesses 15 at the lateral margin of the container bottom 1 and the noses 14 then positively lock behind the recesses, as can be seen from FIG. 5. The locked or interlocked, respectively, position preferably is permanent, so that the intermediate element 10 then in principle is an integral component of the bottom 1. As can be seen from FIG. 5, the side wall 4 then in a load-absorbing manner bearing on the intermediate element can be folded from the illustrated unfolded position to the inside onto the container bottom 1. The film-like hinges preferably extend across the entire length of the side walls and the intermediate elements.

FIG. 7 shows an alternate embodiment of an intermediate element of another side wall, with the intermediate element being formed higher than the intermediate element 10, so that the side wall foldable to the inside, e.g. side wall 4, is disposed higher and thus can be folded over the side wall already folded to the inside. If the embodiment in FIG. 7 is related to the container of FIGS. 1 to 4, the intermediate element will be the intermediate element referred to by 11. The intermediate element with a locking nose 14 interlocks into a respective recess 15 of the bottom 1. In a further modification, which, however, is not necessary, a locking and centering member 16 is provided for at the lower marginal side 6 of the side wall 4, which member in unfolded position reaches into a corresponding groove or recess of the intermediate element and thus further stabilizes the container when its side walls are in the unfolded position.

It will be understood from FIGS. 5 and 7 that the intermediate elements advantageously are built as piling rims, which facilitates stacking of the containers. The lower leg 17 of the intermediate elements, formed as a U (FIG. 5) or an E (FIG. 7) profile, is made somewhat shorter than the legs located thereabove, so that the container with its lower end can be correspondingly placed from above into a container located therebelow and bear on a corresponding shoulder 18 of the side wall of the lower container, which wall thus contributes to load absorption from top to bottom.

FIG. 8 shows a further alternate embodiment in which the intermediate element is not lockable with the container bottom 1 laterally, but is folded from the top to the container bottom, with the respective locking noses 14 reaching from the top into the recesses 15 of the container bottom. This embodiment has the advantage that during load transfer the forces in the container pile are guided through the side walls and the intermediate element on the bottom. This leads to relieving of the locking connections between the intermediate element and the bottom. For clarification, reference numerals of the container of FIGS. 1 to 4 with respect to the side wall 2 have been inserted in FIG. 8.

Figure 9:
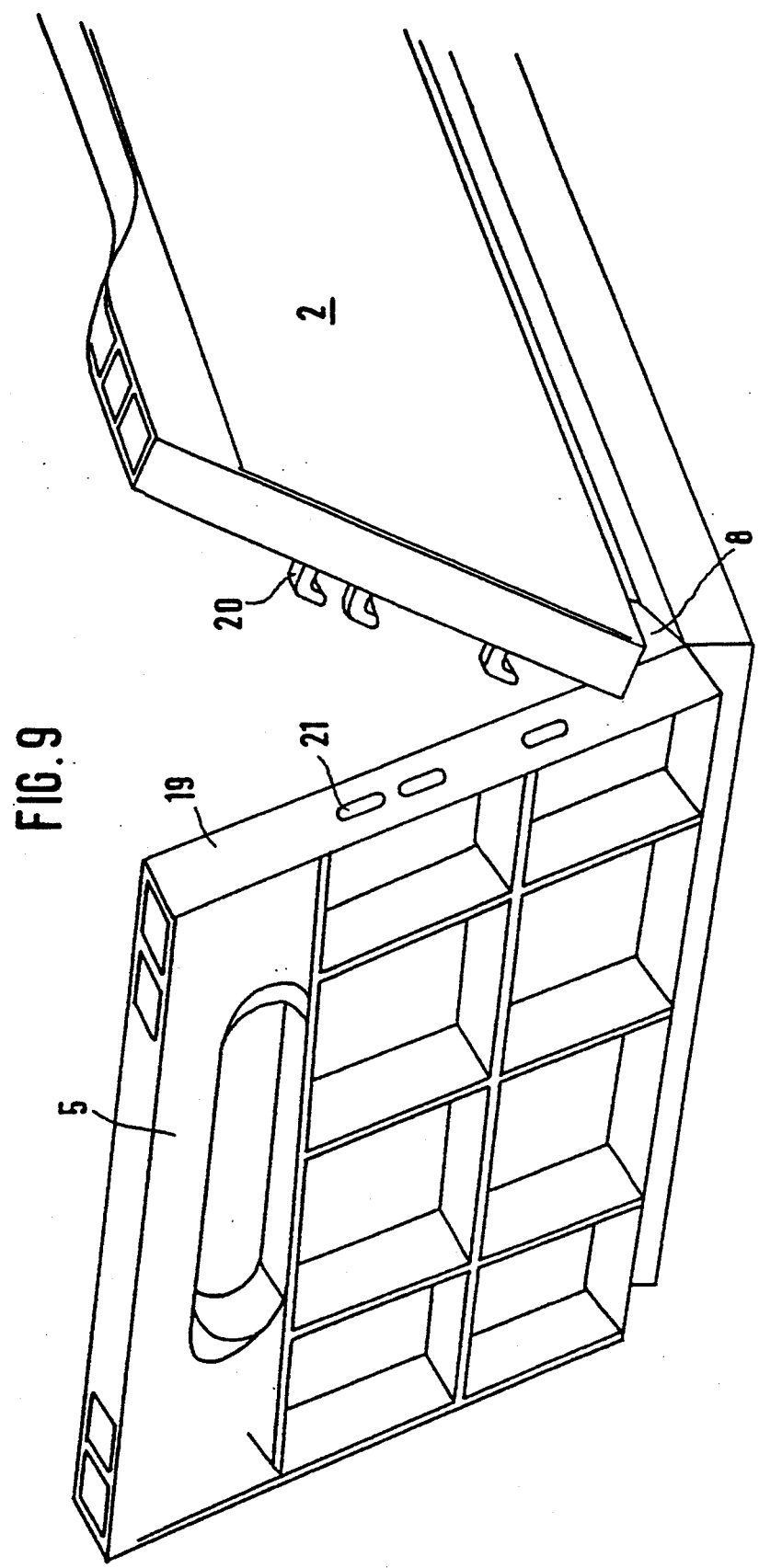
FIG. 9 is a partial view of the container depicting the interlocking of the two unfolded side walls.

FIG. 9 shows the mutual interlocking of the side walls with one another. In opposing side walls 2 and 5 corresponding recesses 21 are formed in marginal sides 19 thereof and corresponding locking hooks 20 are formed at the rims of the side wall 2 at the inner wall face, preferably one above the other, so that during unfolding of the side walls the locking hooks 20 can be forced into the corresponding recesses 21. This interlock is reversible, wherein by gently pulling apart the corresponding side walls 2 and 5 the locking hooks 20 can be moved out of the recesses 21. It is advantageous to arrange three hooks and/or recesses, respectively, one above the other per each side wall.

Figure 10:
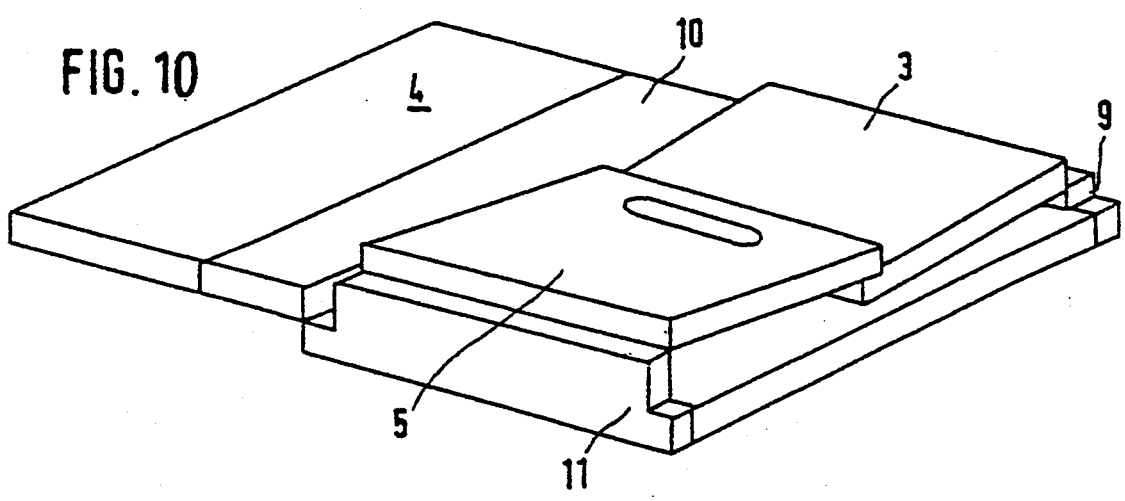
FIG. 10 is a schematic view of the container with the side walls partially folded to the inside.

FIG. 10 also shows the differing height of the intermediate elements, here 9, 10 and 11, so that the side walls each can be folded across the other side walls. The differing height of the intermediate elements 9 and 10 of a pair of opposing side walls 5 and 3 becomes clear from the fact that the side walls 3 and 5 overlap in folded position, so that the intermediate elements must be correspondingly higher by the amount of thickness of the side walls. The intermediate element 10 is correspondingly higher, as the side wall 4 must be folded across the side walls 3 and 5.

Figure 11:
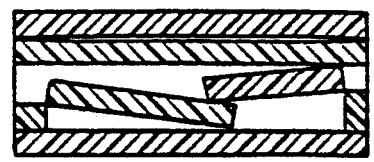
FIG. 11 is a schematic side view of a folded container.

FIG. 11 illustrates the folding of the side walls one over the other and the requirement of differing heights of the intermediate elements.

As can be quite clearly seen from FIGS. 5, 7 and 8, the film-like hinge is located between a side wall and the corresponding intermediate element at the inside margin of the side wall, so that the correspond wall can only be folded to the inside with respect to the container and in upright perpendicular position with its lower marginal face 6 bearing on the corresponding support face 7 of the intermediate element. The side wall thus cannot be folded to the outside.

I claim:

1. A one-piece container having an interior volume for carrying items, such as vegetables, said one-piece container comprising:
   a bottom member having four edges;
   four intermediate side walls, each intermediate side wall of said four intermediate side walls having a respective top edge and bottom edge, each respective bottom edge of said four intermediate side walls being connected to a respective edge of said four edges of said bottom member;
   four side walls, each side wall of said four side walls having a bottom edge connected to a respective top edge of a respective intermediate side wall of said four intermediate side walls and being foldable in a direction toward said interior volume of said container, and in a direction away from said interior volume of said container;
   a first hinge means integrally connecting said respective bottom edge of each said intermediate side wall of said four intermediate side walls with a respective edge of said four edges of said bottom member; and
   a second hinge means integrally connecting said top edge of a respective intermediate side wall of said four intermediate side walls with said respective bottom edge of said side wall of said four side walls;
   whereby each side wall of said four side walls, each intermediate side wall of said four intermediate side walls and said bottom member are all integrally connected such that each side wall of said four side walls will only fold inward independent of its respective intermediate side wall and each side wall of said four side walls will only fold outward in conjunction with its respective intermediate side wall.

2. The one-piece container of claim 1 wherein said one-piece container is rectangular in shape, said one-piece container having a longitudinal side and a narrow side, said intermediate side walls of said longitudinal side having a height different than the height of said intermediate walls of said narrow side, wherein said height difference between said intermediate side walls of said narrow side and said intermediate side walls of said longitudinal side corresponds to an integer factor of the thickness of a side wall of said four side walls.

3. The one-piece container of claim 1 further comprising:
   means for locking each said intermediate side wall of said four intermediate side walls with said bottom member.

4. The one-piece container of claim 3 wherein said locking means further comprises:
   means for permanently locking said intermediate side wall to said bottom member.

5. The one-piece container of claim 3 wherein each intermediate side wall of said four intermediate side walls has a height different from each other, and wherein each difference in height between any two intermediate side walls corresponds to an integer factor of the thickness of a side wall of said four side walls.

6. The one-piece container of claim 5 further comprising means for locking each said side wall of said four side walls to its adjoining side wall of said four side walls.

7. The one-piece container of claim 5 wherein each intermediate side wall of said four intermediate side walls has a U-shaped cross section.

8. The one-piece container of claim 5 wherein each intermediate side wall of said four intermediate side walls has an E-shaped cross section.

9. The one-piece container of claim 5 wherein each intermediate side wall of said four intermediate side walls has an E-shaped cross section.

10. The one-piece container of claim 1 wherein said first hinge means and said second hinge means are each an integral thin-film hinge.

* * * * *